United States Patent
Kalderen et al.

(10) Patent No.: US 10,582,526 B2
(45) Date of Patent: Mar. 3, 2020

(54) SYSTEM AND METHOD FOR MEASURING END-TO-END CHANNEL CAPACITY ENTROPY

(71) Applicant: Verizon Patent and Licensing Inc., Arlington, VA (US)

(72) Inventors: Bjorn Olof Erland Kalderen, South Orange, NJ (US); Haim S. Ner, Fair Lawn, NJ (US); Said Soulhi, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 15/827,166

(22) Filed: Nov. 30, 2017

(65) Prior Publication Data

US 2019/0166606 A1  May 30, 2019

(51) Int. Cl.
| | |
|---|---|
| *H04W 72/12* | (2009.01) |
| *H04B 7/08* | (2006.01) |
| *H04L 1/00* | (2006.01) |
| *H04L 12/24* | (2006.01) |
| *H04Q 3/00* | (2006.01) |
| *H04L 12/26* | (2006.01) |
| *H04L 12/801* | (2013.01) |

(52) U.S. Cl.
CPC ...... *H04W 72/1231* (2013.01); *H04B 7/0842* (2013.01); *H04L 1/0009* (2013.01); *H04L 41/083* (2013.01); *H04L 41/147* (2013.01); *H04L 41/5012* (2013.01); *H04L 43/0888* (2013.01); *H04L 47/127* (2013.01); *H04Q 3/0062* (2013.01); *H04Q 2213/13526* (2013.01)

(58) Field of Classification Search
None
See application file for complete search history.

(56) References Cited

U.S. PATENT DOCUMENTS

2012/0020216 A1 * 1/2012 Vashist ................. H04L 41/14
370/235

* cited by examiner

*Primary Examiner* — Ayaz R Sheikh
*Assistant Examiner* — Sori A Aga

(57) ABSTRACT

A network device predicts end-to-end channel capacity entropy to permit use of optimal throughput settings in a network. The network device stores class definitions for a network condition; identifies multiple input features to correlate with the class definitions; generates a multiclass classification model that produces an importance score for each of the multiple input features, wherein the importance score reflects the contribution of an input feature to the network condition; selects two or more of the multiple input features with highest importance scores as influential features; predicts the behavior of the influential features to identify a current class, from the class definitions, for the network condition over an end-to-end communication channel; and sends an estimated network condition, based on the current class, to a device for traffic optimization.

20 Claims, 10 Drawing Sheets

| Input Features | Description |
|---|---|
| Ctxt_Drop% | Context Drop Rate |
| Ctxt_Setup_Fail% | Context Setup Failure Rate |
| RRC_Drop% | RRC Drop Rate |
| RRC_Connection_Fail% | RRC Failure Rate |
| HO_Fail% | Handover Failure Rate |
| RRC_Conn_Blk% | RRC Connection Block Rate |
| RRCUsers_AvgConnected | Average Number of RRCs in Connected Mode |
| Total_ERAB_SF% | Total Eutran Radio Access Bearer Service Failure Rate |
| Default_ERAB_Brr_SF% | Default Eutran Radio Access Bearer Service Failure Rate |
| Ded_ERAB_Brr_SF% | Dedicated Eutran Radio Access Bearer Service Failure Rate |
| Total_ERAB_Brr_Drop% | Total Eutran Radio Access Bearer Drop Rate |
| Ded_ERAB_Brr_Drop% | Dedicated Eutran Radio Access Bearer Drop Rate |
| DL_Init_BLER% | Downlink –Initial Block Error Rate |
| DL_RLC_ReTx% | RLC Retransmission Rate -Downlink |
| DL_Resid_BLER% | Downlink Residual Block Error Rate |
| L1_UL_Thpt | L1 Throughput-Downlink |
| L1_DL_Thpt | L1 Throughput-Uplink |
| UL_Init_BLER% | Uplink Initial Block Error Ratio |
| UL_Resid_BLER% | Uplink Residual Block Error Ratio |
| PRB_Util_DL_15min_Pct | Physical Resource Block Utilization –Downlink |
| PRB_Util_UL_15min_Pct | Physical Resource Block Utilization –Uplink |
| DL_TotalEutranRadio | Access Bearer Drop Rate |
| DL RLC_Delay(ms) | Downlink RLC Delay in ms |
| RTT (Calculated) | Application Layer Round Trip Time |

SYSTEM AND METHOD FOR MEASURING END-TO-END CHANNEL CAPACITY ENTROPY

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices.

BRIEF DESCRIPTION OF THE DRAWINGS

FIG. 5 is a list of exemplary input features used in the channel capacity entropy analyzer of FIG. 4;

DETAILED DESCRIPTION OF PREFERRED EMBODIMENTS

Figure 1:
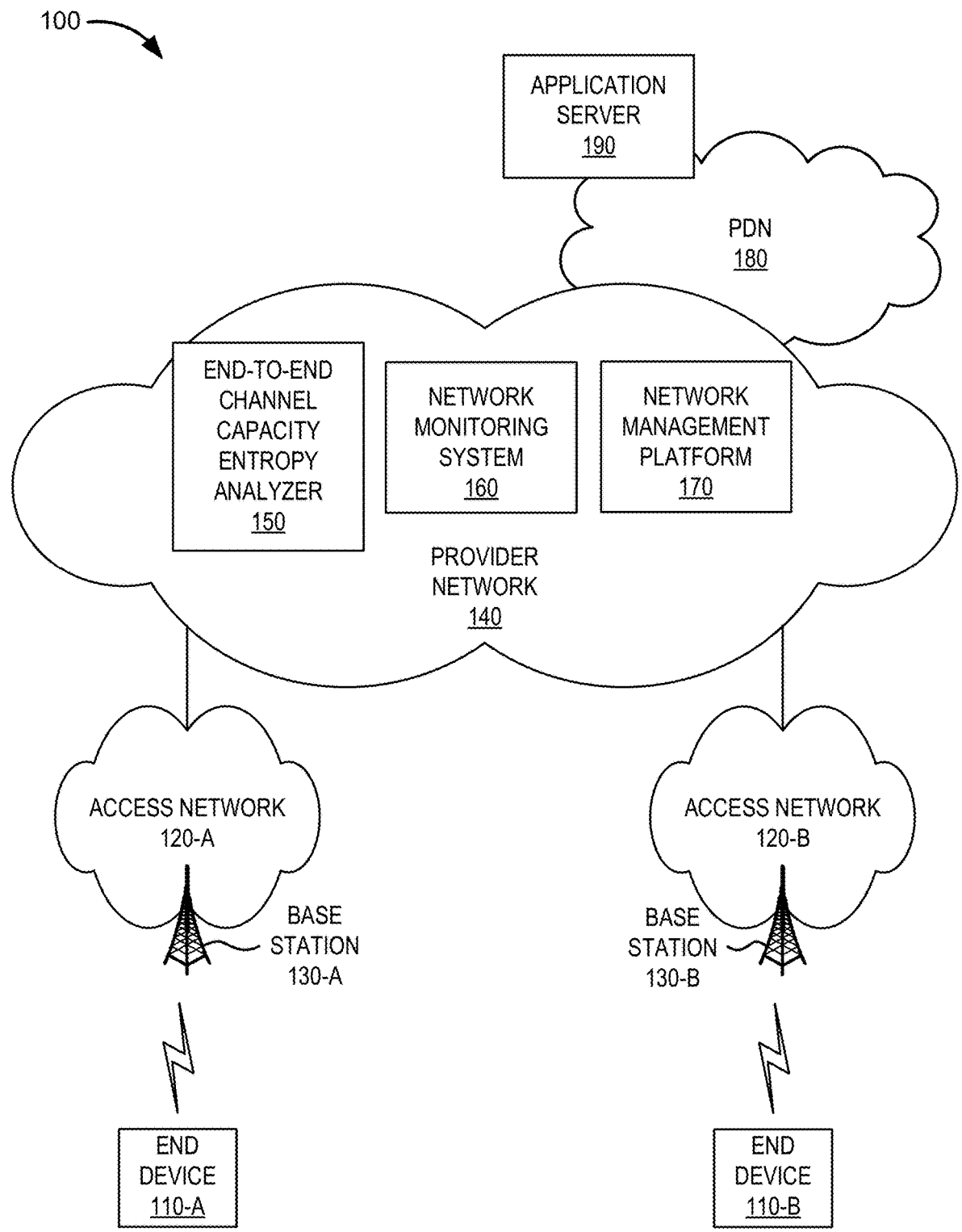
FIG. 1 is a diagram illustrating a network environment in which systems and methods described herein may be implemented.

The following detailed description refers to the accompanying drawings. The same reference numbers in different drawings identify the same or similar elements.

Applications residing on devices typically do not have end-to-end channel capacity information for a network. As a result, applications sometimes send too much information over the network at one time, which results in packet drops and performance degradation. In other cases, applications sometimes send too little information at a time, which results in underutilization of the available channel capacity. Both these cases can have an impact on the user experience.

Currently, end-to-end channel capacity information available to traffic management systems in the network does not include a determination of contributing factors causing congestion or latency issues during certain network conditions. Furthermore, there are no specific key performance indicators (KPIs) to measure end-to-end channel capacity entropy. Traditional KPI measurement techniques are based on linear methods and are not able to capture non-linear relationships between multiple KPIs.

Systems and methods described herein may use multiple different kinds of KPIs to evaluate end-to-end channel capacity entropy. End-to-end channel capacity entropy may refer to degradation or a trend toward congestion disorder in a network communication channel between two end devices. Each KPI carries some information of network conditions (e.g., delays, congestion, and utilization) reflecting on capacity. However, because of the interrelationship between KPIs and network parameters it is not always possible for personnel attempting to optimize network performance to determine the impact any one KPI may have on a network. Historic KPIs can be processed by a machine learning system and correlated to relative entropy conditions. Present KPI values for a current protocol/application session may then be applied to predict channel capacity conditions (such as application layer round trip time (RTT) or burst rates), and provide the conditions to the protocol and application. The protocol and/or application can then proactively and/or automatically adjust throughput (e.g., transmission control protocol (TCP) throughput, send window size, etc.) to optimize available channel capacity (e.g., for real-time transmission rate optimization), thereby improving network efficiencies, and improving bandwidth and overall network capacity. In an embodiment, the systems and methods described herein may be used in conjunction with self-optimizing tools to ensure peak performance of the network.

According to one implementation, a network device predicts end-to-end channel capacity entropy to permit use of optimal throughput settings in a network. The network device may store class definitions for a network condition; may identify multiple input features to correlate with the class definitions; may generate a multiclass classification model that produces an importance score for each of the multiple input features, wherein the importance score reflects the contribution of an input feature to the network condition; may select two or more of the multiple input features with highest importance scores as influential features; may predict the behavior of the influential features to identify a current class, from the class definitions, for the network condition over an end-to-end communication channel; and may send an estimated network condition, based on the current class, to a device for traffic optimization.

FIG. 1 is a diagram of an exemplary network environment 100 in which the systems and/or methods, described herein, may be implemented. As shown in FIG. 1, network environment 100 may include end devices 110-A and 110-B (generically "end device 110"), access networks 120-A and 120-B, a provider network 140, a packet data network (PDN) 180, and an application server 190. End device 110-A may connect to provider network 140 via access network 120-A, and end device 110-B may connect to provider network 140 via access network 120-B. End device 110-A may establish a communication session with end device 110-B via access network 120-A, provider network 140, and access network 120-B. In other implementations, end device 110-A may establish a communication session with another type of device, such as application server 190, an end device 110 connected to provider network 140 via a wired connection, and/or another type of end device 110.

In some implementations, end device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS)

device; a laptop computer, a tablet computer, or another type of portable computer; a media playing device; a portable gaming system; a home appliance device; a home monitoring device; and/or any other type of computer device with wireless communication capabilities.

In other implementations, end device 110 may correspond to an embedded wireless device that communicates wirelessly with other devices over a machine-to-machine (M2M) interface using Machine Type Communication (MTC) and/or another type of M2M communication. As an example, end device 110 may be electrically connected to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Access network 120 may include one or multiple networks of one or multiple types. For example, access network 120 may be implemented to include a terrestrial network, a satellite network, a wireless network, and/or a wired network. According to an exemplary implementation, access network 120 includes a radio access network (RAN) as defined by standards governing entities, such as the Third Generation Partnership Project (3GPP) or the International Telecommunication Union (ITU). The RAN may be a Third Generation (3G) RAN, a Fourth Generation (4G) RAN, a 4.5G RAN, a future generation wireless network architecture (e.g., a Fifth Generation (5G) RAN), etc. By way of further example, access network 120 may include an Evolved Universal Mobile Telecommunications System (UMTS) Terrestrial Radio Access Network (E-UTRAN) of a Long Term Evolution (LTE) network or LTE-Advanced (LTE-A) network, a U-TRAN, a UMTS RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 120 may include various network elements, such as base stations 130, a Node B, an evolved Node B (eNB), a base station controller, a radio network controller (RNC), a femto device, a pico device, a home eNB, a relay node, a wireless access point, or other type of wireless node that provides wireless access. Access network 120 may include a wired network. For example, access network 120 may include an optical network or a cable network.

According to an implementation, base station 130 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 130) and other components and functionality that allow end device 110 to wirelessly connect to access network 120. The eNodeB base station device may include or be associated with one or more cells. For example, each cell may include an RF transceiver facing a particular direction. Base station 130 may interface with devices in access network 120 via an interface referred to as an S1 interface, which may be split into a control plane S1-MME interface and a data plane S1-U interface. The S1-MME interface may interface with a mobility management entity (MME, not shown). The S1-U interface may interface with a serving gateway (SGW, not shown).

Provider network 140 may be managed, at least in part, by a provider of communication services associated with one or both of access network 120-A and 120-B. Provider network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. According to an implementation, provider network 140 may include a core network. The core network may include a complimentary network pertaining to the one or multiple RANs described above. For example, the core network may include the core part of an LTE network, an LTE-A network, etc. Depending on the implementation, the core network may include various network elements, such as a gateway, a support node, a serving node, a router, a switch, a bridge, as well other network elements pertaining to various network-related functions, such as billing, security, authentication and authorization, network polices, subscriber profiles, etc.

Provider network 140 may allow the delivery of Internet Protocol (IP) services to end device 110, and may interface with other external networks, such as PDN 180. In some implementations, provider network 140 may include an Internet Protocol Multimedia Subsystem (IMS) network (not shown in FIG. 1). An IMS network may include a network for delivering IP multimedia services as specified by 3GPP or other standards/protocols and may provide media flows between end device 110 and external IP networks or external circuit-switched networks (not shown in FIG. 1). Provider network 140 may include one or more server devices and/or network devices, or other types of computation or communication devices to manage the functionality of provider network 140. For example, provider network 140 may include an end-to-end channel capacity entropy analyzer 150, a network monitoring system 160, and a network management platform 170.

End-to-end channel capacity entropy analyzer 150 (referred to hereafter as "entropy analyzer 150") may include one or more devices, such as computer devices and/or server devices, which analyze multiple different KPIs that impact end-to-end network communications (e.g., between end device 110 and application server 190 or between end devices 110). According to an implementation, entropy analyzer 150 may receive KPIs from multiple interfaces/devices within network environment 100, including RAN interfaces such as E-UTRA air interfaces and S-1 interfaces. As described further herein, entropy analyzer 150 may apply machine learning to derive the protocols and/or applications delays, identify the key features impacting congestion and utilization of a protocol/application session and provide context-sensitive traffic optimization guidelines to the corresponding protocol and application. In contrast with conventional KPI analysis (or human analysis), entropy analyzer 150 may identify non-linear relationships in KPIs that correlate to end-to-end network conditions (such as congestion). Entropy analyzer 150 may use machine learning to identify the complex interrelationship between KPIs and different network conditions, identifying the most-influential KPIs, and predicting network behavior based on projections for the most-influential KPIs.

Network monitoring system 160 may include one or more devices, such as computer devices and/or server devices, which monitor, collect, manage, and/or maintain network management information for provider network 140. In an embodiment, network monitoring system 160 may monitor and collect many different KPIs, such as latency information, various drop rates, different error rates, etc., for provider network 140. For example, network monitoring system 160 may maintain historical and/or current latency data for particular links and/or devices in provider network 140. Additionally or alternatively, network monitoring system 160 may obtain KPIs for particular communication channels (e.g., a physical or logical connection over a multiplexed medium), sessions, and/or for a particular type of communication session. Network monitoring system 160 may provide the KPIs to entropy analyzer 150.

Network management platform 170 may include one or more devices, such as computer devices and/or server devices, which perform traffic management functions for provider network 140. Network management platform 170 may also maintain and/or manage service requirements information for provider network 140. For example, network management platform 170 may store service requirement information, including latency requirements, for particular service types (e.g., Quality of Service (QoS) class, sessions associated with a particular application, sessions associated with a particular communication protocol, etc.).

Network management platform 170 may adjust throughput settings in access network 120 and/or provider network 140 based on end-to-end latency and based on the service requirements associated with particular service types. In one implementation, network management platform 170 may include a self-optimizing network (SON) system for provider network 140. In another implementation, network management platform 170 may include a TCP/video optimization service or another type of traffic management system for provider network 140.

PDN 180 may include a network that provides data services (e.g., via packets or any other IP datagrams). For example, PDN 180 may include the Internet, an intranet, etc.

Application server 190 may include one or more devices, such as computer devices and/or server devices, which are configured to communicate with end device 110. For example, application server 190 may be configured to send and receive data for applications residing on end devices 110. Application server 190 may be located inside PDN 180 or a private network (not shown in FIG. 1) that is connected to provider network 140. In other implementations, application server 190 may be located inside provider network 140.

Although FIG. 1 shows exemplary components of network environment 100, in other implementations, network environment 100 may include fewer components, different components, differently arranged components, or additional functional components than depicted in FIG. 1. Additionally or alternatively, one or more components of network environment 100 may perform functions described as being performed by one or more other components of environment 100.

Figure 2:
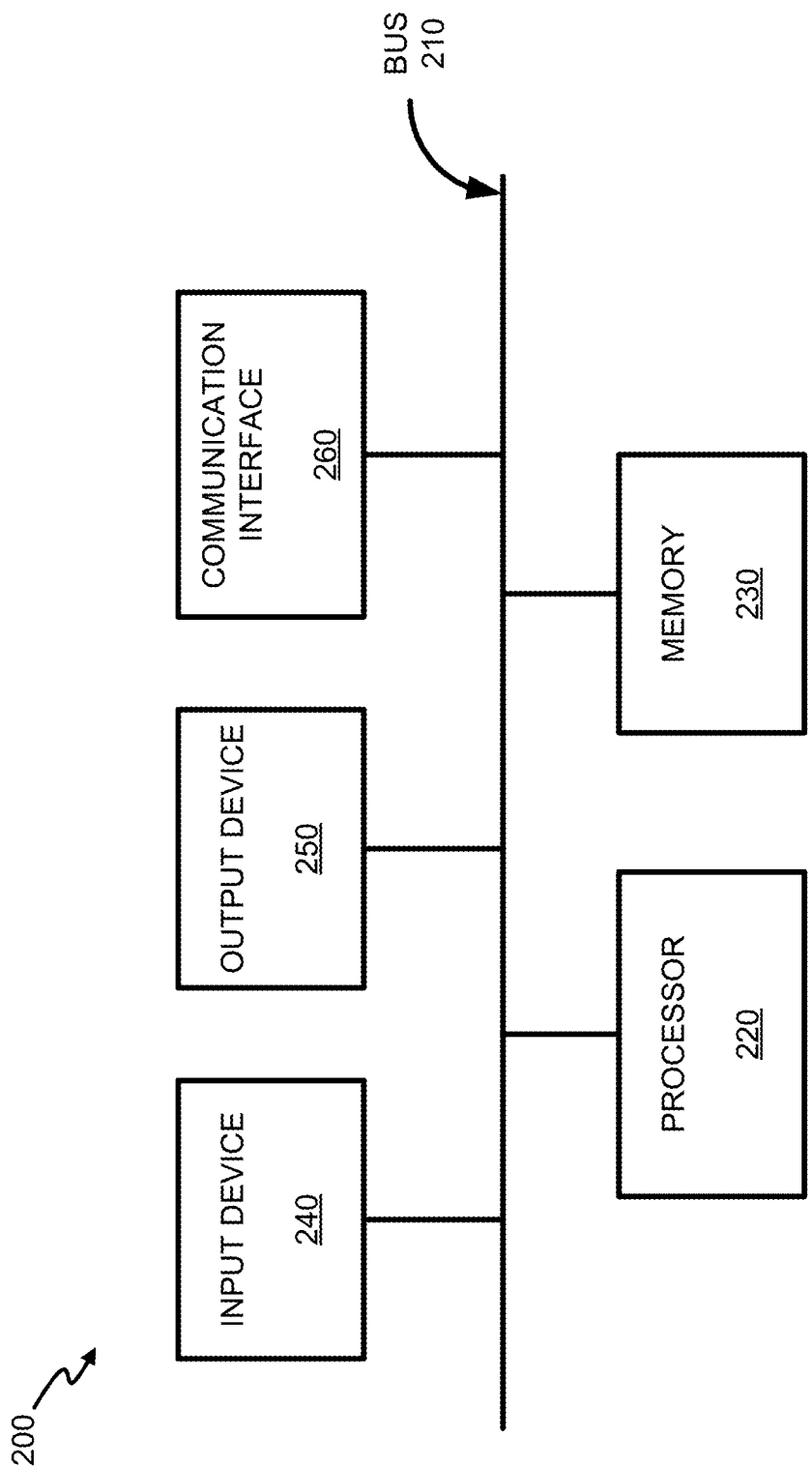
FIG. 2 is a diagram illustrating exemplary components of a device that may be included in a device of FIG. 1.

FIG. 2 is a diagram illustrating exemplary components of device 200 according to an implementation described herein. End devices 110, base station 130, entropy analyzer 150, network monitoring system 160, network management platform 170, and application server 190 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. If device 200 is included in end device 110 or base station 130, communication interface 260 may include an antenna assembly.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a Wi-Fi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to dynamic adjustment of the maximum allowed number of repeat requests transmissions. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
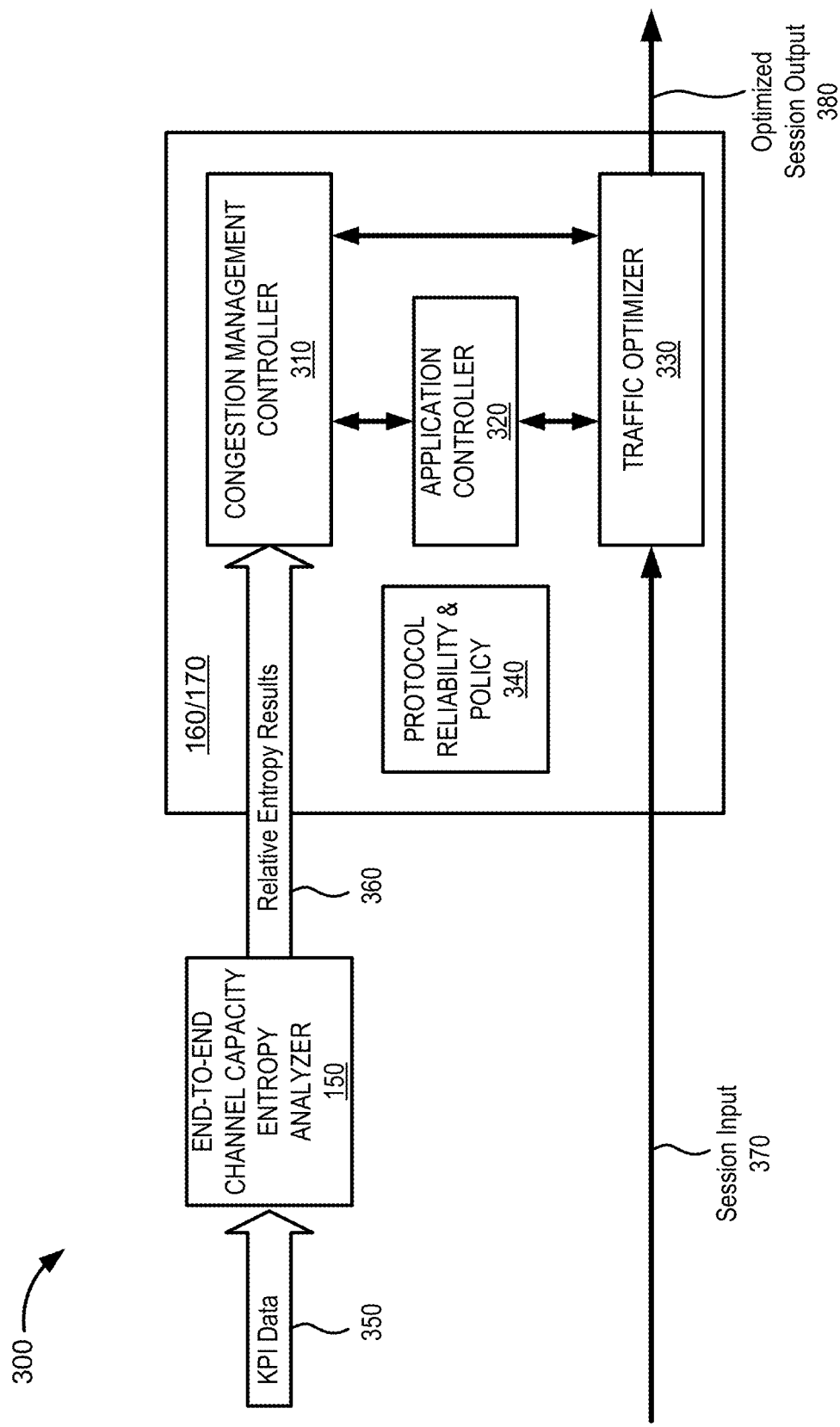
FIG. 3 is a block diagram illustrating exemplary communications and logical components in a portion of the network environment of FIG. 1.

FIG. 3 is a block diagram illustrating communications and exemplary logical components in a portion 300 of network environment 100. As shown in FIG. 3, network portion 300 may include entropy analyzer 150, network monitoring system 160, and network management platform 170. Logical components in network monitoring system 160 and/or network management platform 170 may include a congestion management controller 310, an application controller 320, a traffic optimizer 330, and a protocol reliability and policy unit 340.

As shown in FIG. 3, KPI data 350 may be provided to entropy analyzer 150. As described further herein, entropy analyzer 150 may generate and tune models to calculate relative entropy results 360. Relative entropy results 360 may indicate features that indicate a gradual system decline into congestion disorder and may be used to predict application layer (e.g., TCP/IP application layer) round trip time (RTT) or burst rates (e.g., burst density or burst duration) for current sessions. The relative entropy results 360 may be provided, for example, to congestion management controller 310. Congestion management controller 310 may apply real-time congestion information to the relative entropy results, and pass the combined information (e.g., as predicted congestion data) to application controller 320 and traffic optimizer 330.

Application controller 320 may perform application detection and select an optimization type (e.g., video pacing, MTC management, TCP optimization, etc.) for the application session. For example, application controller 320 may enable application security policies to identify, allow, block, or limit usage (based on bandwidth and/or time) of different types of applications. Additionally, or alternatively, application controller 320 may control applications usage by specific users, groups of users, and/or the device running the application. In one implementation, application controller 320 may also manage clusters of high utilization.

Traffic optimizer 330 may receive session input 370 from, for example, application server 190 and/or end device 110. Traffic optimizer 330 may apply to session input 370 TCP optimization, smart pacing (e.g., video pacing or other data pacing), user datagram protocol (UDP) optimization, or other optimization techniques based on information from application controller 320 and management congestion controller 310. For example, traffic optimizer 330 may apply limits from protocol reliability and policy unit 340. Protocol reliability and policy unit 340 may receive and store network settings and policies for TCP, UDP, and other transfer protocols. In one implementation, traffic optimizer 330 may also detect/block faulty hosts. After optimization, traffic optimizer 330 may provide optimized session output 380 toward the destination (e.g., end device 110).

Figure 4:
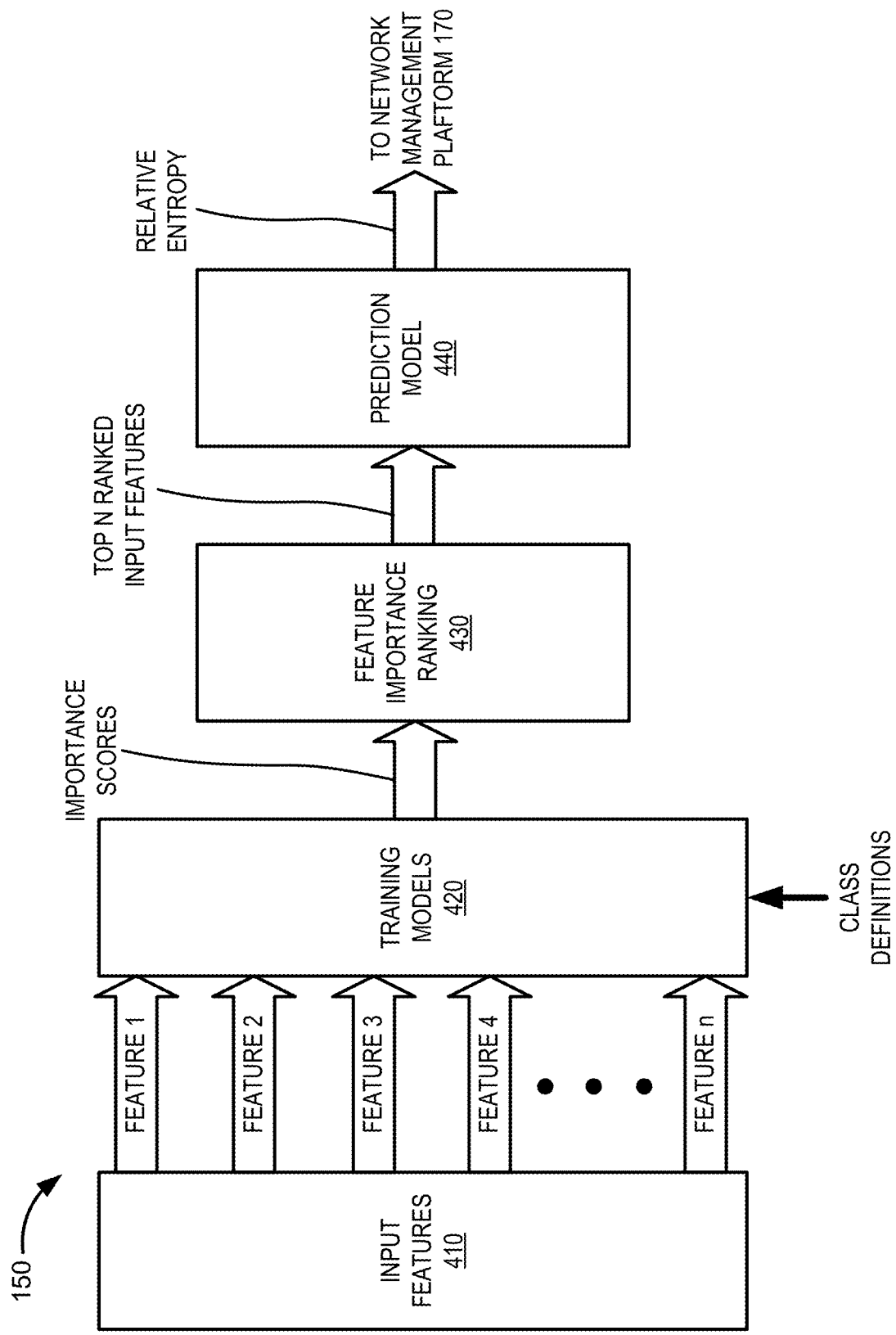
FIG. 4 is a block diagram illustrating exemplary communications and logical components of the channel capacity entropy analyzer of FIG. 1.

FIG. 4 is a block diagram illustrating exemplary communications and logical components of entropy analyzer 150. As shown in FIG. 4, entropy analyzer 150 may include input features 410, training models 420, feature importance ranking 430, and prediction model 440.

Input features 410 may include a list of features selected for inclusion in a channel entropy analysis. Input features may include, for example, performance indicators for access network 120 and/or provider network 140. Input features 410 may be selected by a system administrator or generated using an automated feature selection technique. Input features 410 may generally include measurable performance indicators for transmission of data over a network. In some cases, input features 410 may include dozens or hundreds of measurable performance indicators. FIG. 5 is a list of exemplary input features 410 that may be used in channel capacity entropy analyzer 150.

Referring to FIG. 5, input features 410 may include measureable features for a radio access network (e.g., access network 120). In other implementations, input features 410 may include features (e.g., KPIs) from multiple different networks of an end-to-end connection. Input features 410 may include, for example, Context Drop Rate, Context Setup Failure Rate, Radio Resource Control (RRC) Drop Rate, RRC Failure Rate, Handover Failure Rate, RRC Connection Block Rate, Average Number of RRCs in Connected Mode, Total EUTRAN Radio Access Bearer Service Failure Rate, Default EUTRAN Radio Access Bearer Service Failure Rate, Total EUTRAN Radio Access Bearer Drop Rate, Dedicated EUTRAN Radio Access Bearer Drop Rate, Downlink—Initial Block Error Rate, radio link control (RLC) Retransmission Rate—Downlink, Downlink Residual Block Error Rate, Layer 1 (L1) Throughput-Downlink, L1 Throughput-Uplink, Uplink Initial Block Error Ratio, Uplink Residual Block Error Ratio, Physical Resource Block Utilization—Downlink, Physical Resource Block Utilization—Uplink, Access Bearer Drop Rate, Downlink RLC Delay (in milliseconds), and Application Layer Round Trip Time. It is to be understood that FIG. 5 is only a small representation of the large number of input features 410 available. While 24 input features 410 were selected for the example of FIG. 5, in other implementations other measurable or calculable indicators may be used for input features 410.

Figure 6:
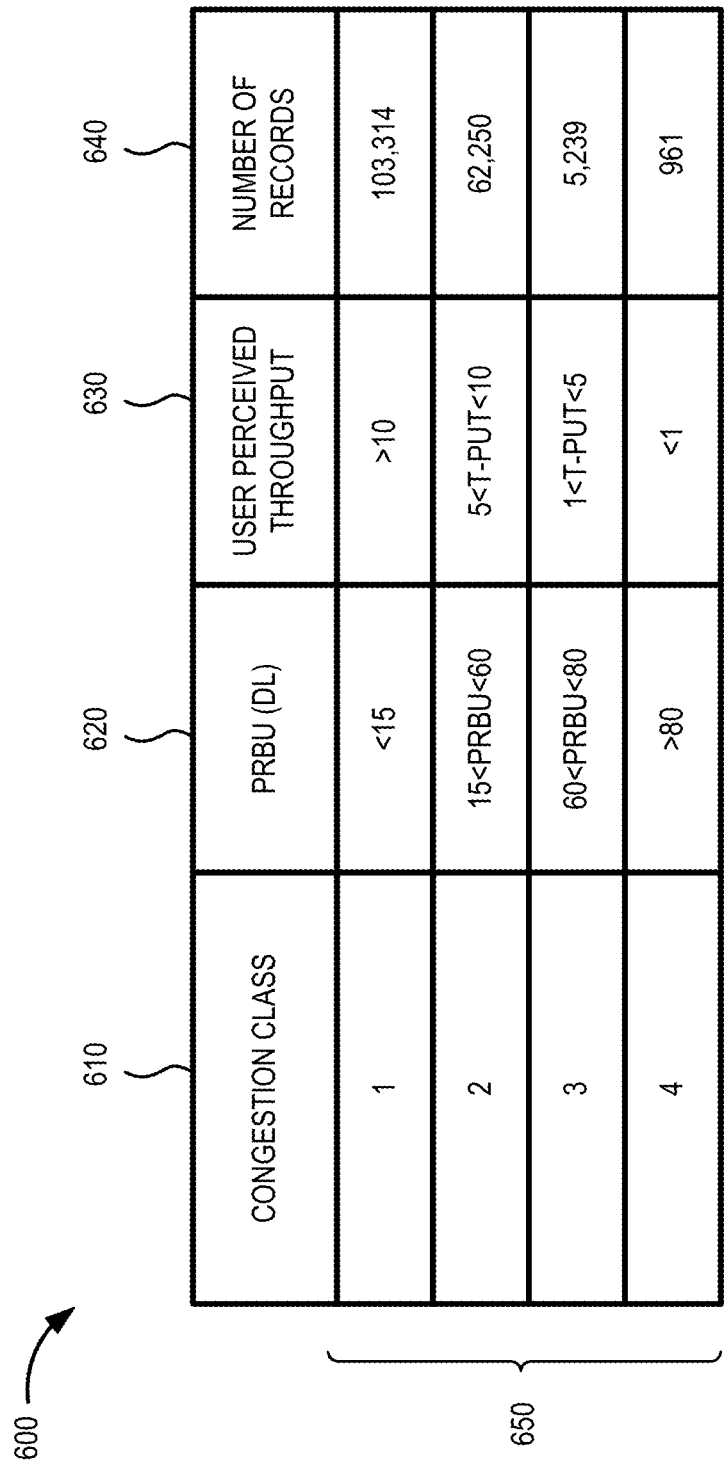
FIG. 6 is an example of a congestion class definition table, according to an implementation described herein.

Returning to FIG. 4, input features 410 may be used in a multiclass classification training model 420 (e.g., in contrast with a binary classification model) with pre-defined classes (e.g., defined by a system administrator, identified through machine learning, etc.). Class definitions may define, for example, congestion levels based on RTT, latency, dropped packets, physical resource block utilization (PRBU) or another KPI. FIG. 6 is an example of a class definition table 600 that may be used by training model 420. As shown in FIG. 6, network congestion may be defined under one of four classes in class definition table 600 ranging from least congested (e.g., congestion class 1) to most congested (e.g., congestion class 4) based on physical resource block utilization and perceived throughput.

Congestion class definition table 600 may include a congestion class field 610, a physical resource block utilization-downlink (PRBU (DL)) field 620, a user perceived throughput field 630, a number of records field 640, and a variety of entries 650 for fields 610-640. Congestion class field 610 may identify a class name/identifier for a congestion level (e.g., class levels 1 through 4). PRBU (DL) field 620 may indicate a downlink PRBU amount (e.g., "<15") for a corresponding congestion class field (e.g., class "1"). User perceived throughput field 630 may indicate a user perceived TCP throughput value (e.g., ">10"). Number of records field 640 may indicate a number of network measurement records (e.g., "103,314") associated with the training data for a corresponding congestion class field.

Congestion class definition table 600 is an illustration of one form of multiclass categorization that may be used by entropy analyzer 150. In one implementation, historical or predicted network KPI data may be compared to values in PRBU (DL) field 620 and/or user perceived throughput field 630 to determine a corresponding congestion class. The number of classes, the range of values for each class, and the representation of each class (e.g., representing congestion or another category for optimization) may differ in other implementations.

Referring back to FIG. 4, in one implementation, multiclass classification training model 420 may apply machine learning to generate feature importance scores interpreted as the most influential factors into RAN congestion. A feature importance score may be provided for each of input features 410-1 through 410-n. In one implementation, an Extreme Gradient Boosting (XGBoost) algorithm, adaptive boosting, or another machine learning classification technique may be used for multiclass classification training model 420.

Training model 420 may provide estimates of feature importance from a trained predictive model. Many classification algorithms may be applied. In one implementation, gradient boosting may provide a technique to retrieve importance scores for each feature after boosted decision trees for the model are constructed. An importance score provides a score that indicates how useful or valuable each feature was in the construction of the boosted decision trees within the model. The more an attribute (e.g., one of input features 410) is used to make key decisions with decision trees, the higher is that attribute's relative importance. The importance score (or F score) for an attribute may be considered a sum of how many times a feature is split on. The importance score may be a raw score, a weighted score, a percentile, or another form of a comparative value between input features 410.

Figure 7A:
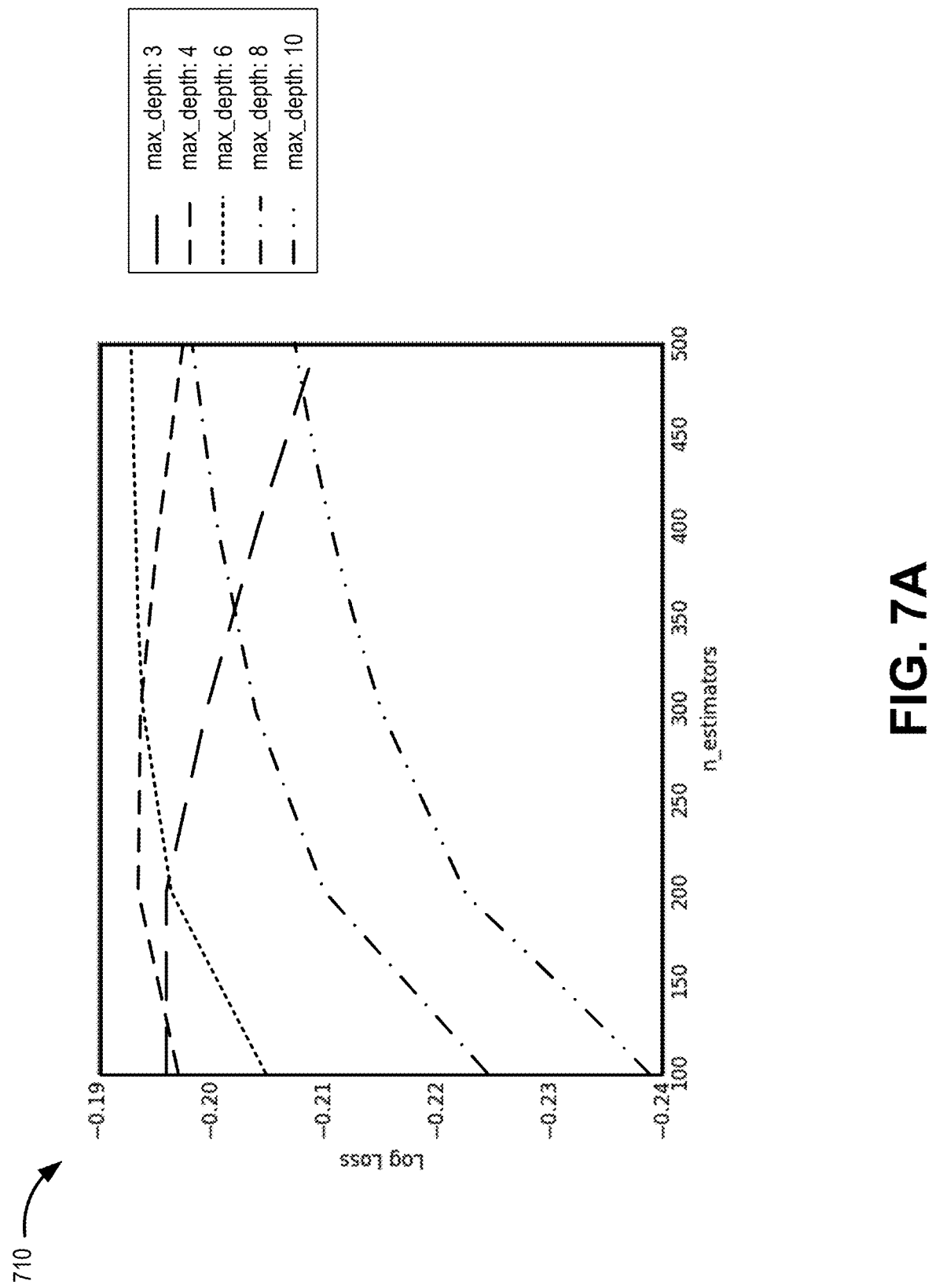
FIG. 7A is a simplified example of a depth optimization analysis for tuning a multiclass classification model.

According to an implementation, training model 420 may be tuned for depth optimization and learning rate optimization. For depth optimization, entropy analyzer 150 may determine the maximum depth of the trees in training model 420 that minimizes the logarithmic loss, where logarithmic loss measures the accuracy of a classifier in a multi-class system. For example, FIG. 7A is an illustrative plot 710 of logarithmic loss versus the number of estimators for different tree depths in training model 420. As shown in FIG. 7A, a best (smallest) loss value is shown for 500 estimators, with a maximum tree depth of 6.

Figure 7B:
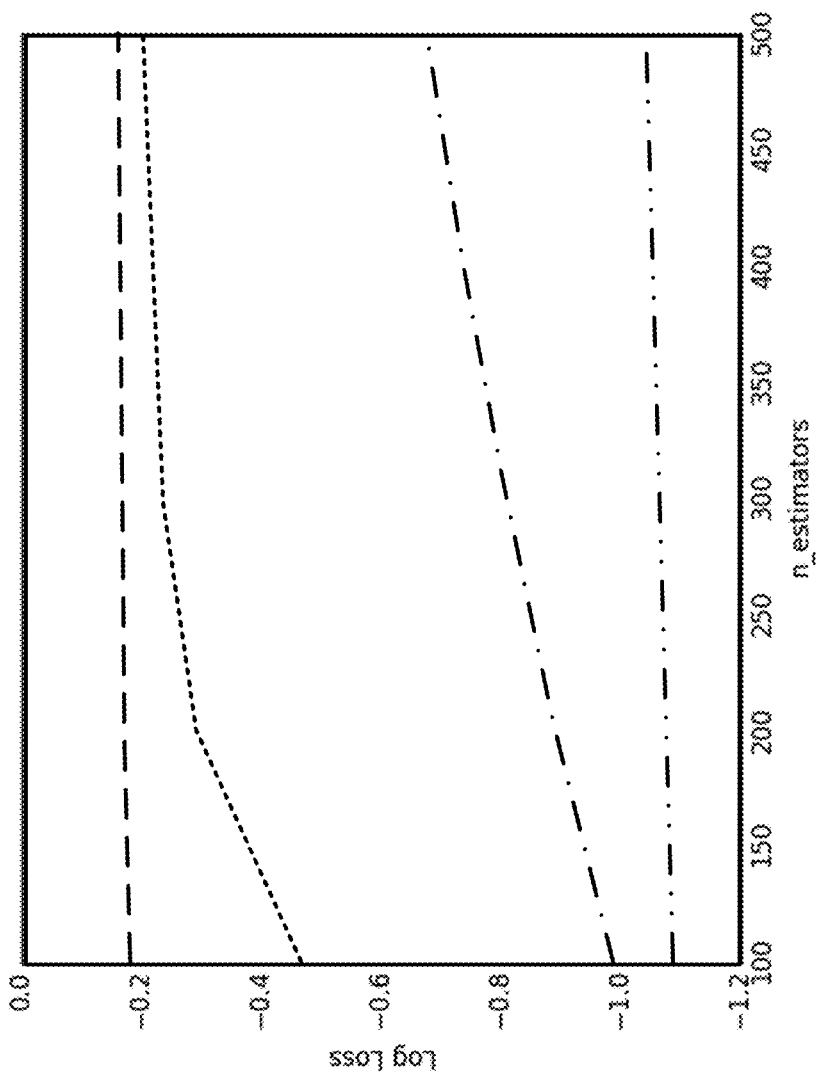
FIG. 7B is a simplified example of a learning rate optimization analysis for tuning a multiclass classification model.

For learning rate optimization, entropy analyzer 150 may determine the learning rate in training model that minimizes the loss. The learning rate determines how quickly a training model 420 may converge. For example, FIG. 7B is an illustrative plot 720 of logarithmic loss vs. a number of estimators for different learning rates in training model 420. As shown in FIG. 7B, a best (smallest) loss value is shown for 500 estimators, with a maximum learning rate of 0.1.

Referring to FIG. 4, feature importance ranking 430 may rank input features 410 based on the importance score determined by the tuned training model 420. Feature importance ranking 430 represents the relative channel capacity entropy caused by each of input features 410. According to an implementation, feature importance ranking 430 may identify the highest scored N number of features (where N is more than 1) to use for predictive modeling. In one implementation, the number, N, of input features may be selected based on the relative weights (e.g., the number of input features required to account for the top 20% or more of the importance scores) or another automated selection criteria. In another implementation, a fixed number may be selected for N (e.g., by a system administrator, etc.).

Figure 8:
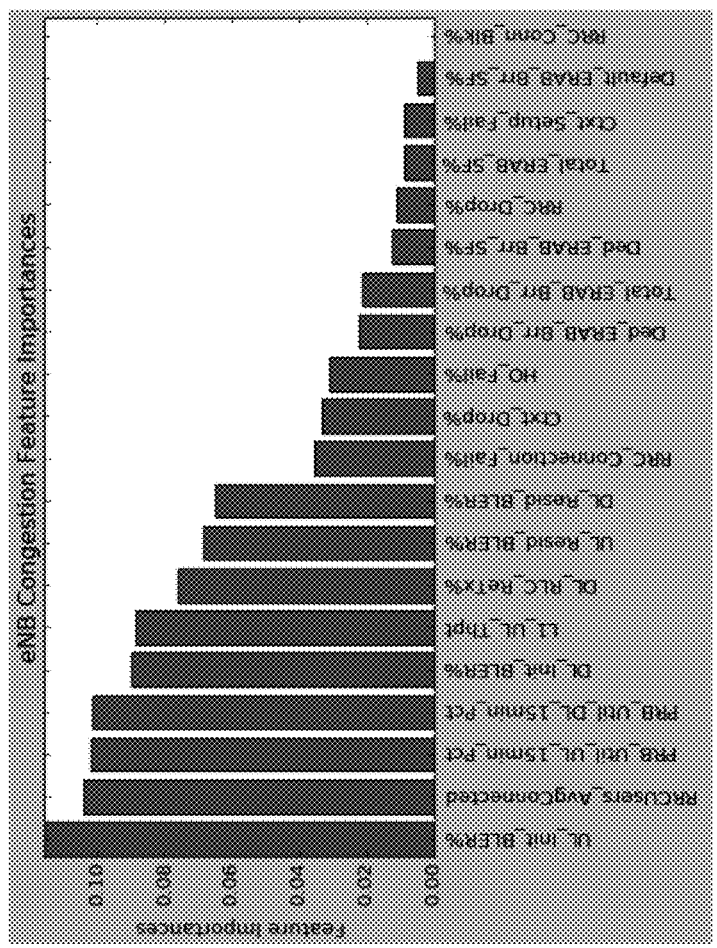
FIG. 8 is a simplified example of generating feature importance using multiclass classification.

FIG. 8 is an illustrative graph 810 of a portion of ranked input features 410 as ranked by tuned training model 420. As shown in the example of FIG. 8, Uplink Initial Block Error Ratio (UL_Init_BLER %), Average Number of radio resource control (RRCs) in Connected Mode (RRCUsers_AvgConnected), Physical Resource Block Utilization—Uplink (PRB_Util_UL_15 min_Pct), and Physical Resource Block Utilization—Downlink (PRB_Util_DL_15 min_Pct) are the input features with the four highest importance scores using tuned training model 420. Assuming the number of input features selected for the predictive model is four (e.g., N=4), feature importance ranking 430 may identify these four features as the most influential input features (e.g., affecting channel capacity entropy) for use in prediction model 440.

Returning again to FIG. 4, prediction model 440 may receive and/or identify the N most influential input features and predict their behavior for a particular communication channel. Using the example of the top four most influential input features above, prediction model 440 may analyze these four features to predict their contribution to congestion on a sector or cell (e.g., associated with base station 130). For example, prediction model 440 provides a measurement of relative entropy by predicting the behavior of the influential features to identify a current class (e.g., from congestion class field 610) for the network condition over the end-to-end communication channel. According to one implementation, prediction model 440 may use deep learning to predict behavior of the top most influential features. For example, a Recursive Neural Network based on Long Short Term Memory (RNN LSTM) architecture that uses Backpropagation Through Time (BPTT) may be used as a training algorithm. The LSTM model may be trained using historical input feature values (e.g., 30+ hours of recorded values) to update weights in recurrent neural networks in order to predict the behavior of the top most influential features. Output predictions may span 10 or more hours in advance. Accuracy of the model predictions may be evaluated against subsequent actual RAN data.

Network management platform 170 may receive prediction model 440 and use predicted network congestion levels to optimize traffic flow. For example, traffic optimizer 330 may use predicted values of the top most influential features from prediction model 440 to set transmission throughput for a session based on the estimated network condition (e.g., corresponding to one of the levels in congestion class field 610). Network management platform 170 may continue to monitor values of the top most influential features to implement a feedback loop for prediction model 440.

Although FIG. 4 shows exemplary components of entropy analyzer 150, in other implementations, entropy analyzer 150 may include fewer components, different components, additional components, or differently-arranged components than depicted in FIG. 4. Additionally or alternatively, one or more components of entropy analyzer 150 may perform one or more tasks described as being performed by one or more other components of entropy analyzer 150.

Figure 9:
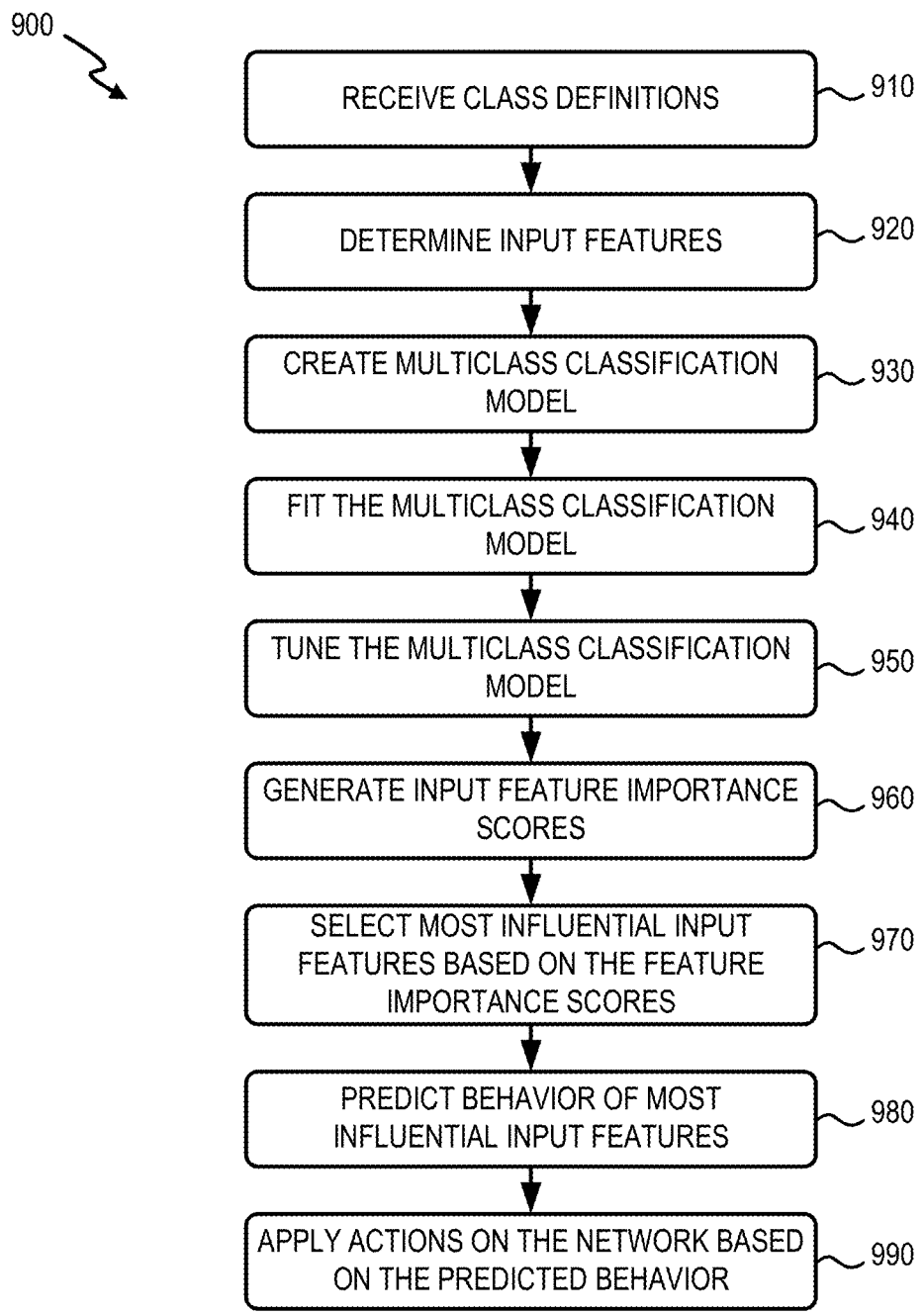
FIG. 9 is a flowchart of a process for estimating and predicting end-to-end channel capacity entropy, according to an implementation described herein.

FIG. 9 is a flow diagram illustrating an exemplary process 900 of estimating and predicting end-to-end channel capacity entropy, according to an implementation described herein. Process 900 may be implemented by one or more entropy analyzer 150 in network environment 100. In another implementation, process 900 may be implemented by entropy analyzer 150 in conjunction with one or more other devices in network environment 100.

Referring to FIG. 9, process 900 may include receiving class definitions (block 910) and determining input features for network communication channels (block 920). For example, entropy analyzer 150 may receive and store (e.g., in memory 230) class definitions for network congestion, such as congestion class definition table 600 (e.g., FIG. 6), or another class category. Input features for the network communication channels may be identified in a listing of KPIs (e.g., a listing provided by a system administrator) or derived from other systems (e.g., network monitoring system 160, etc.).

Process 900 may also include creating a multiclass classification model (block 930), fitting the multiclass classification model (block 940), and tuning the multiclass classification model (block 950). For example, entropy analyzer 150 may construct training model 420 using boosted decision trees (e.g., XGBoost) to reflect how useful or valuable each feature was in the construction of the boosted decision trees within the model. Entropy analyzer 150 may fit training model 420 to historical network data. Training model 420 may be tuned for depth optimization and learning rate optimization. For depth optimization, entropy analyzer 150 may determine the maximum depth of the trees in training model 420 that minimizes the loss. For learning rate optimization, entropy analyzer 150 may determine the learning rate in training model that minimizes the loss.

Process 900 may further includes generating feature importance scores (block 960) and selecting the most influential input features based on the feature importance scores (block 970). For example, entropy analyzer 150 may use the training model to determine an importance score for each input feature for the particular communication channel. The importance score provides an indication of how useful or valuable each input feature was in the construction of the boosted decision trees within the model. The more an attribute (e.g., one of input features 410) is used to make key decisions with decision trees, the higher is that attribute's relative importance. Entropy analyzer 150 may select the N input features with the highest importance scores, where N may be a number greater than one.

Process 900 may additionally include predicting behavior of the most influential input features (block 980) and applying actions on the network based on the predicted behavior (block 990). For example, entropy analyzer 150 may identify the N most-influential input features and predict their behavior for a particular communication channel. Prediction model 440 may analyze these most-influential input features to predict congestion on a sector or cell (e.g., associated with base station 130). According to an implementation, BPTT may be used as a training algorithm to update weights in recurrent neural networks like LSTMs in order to predict the behavior of the most-influential input features. Entropy analyzer 150 may forward the predictions (for the most-influential input features) to network management platform 170, for example, to allow applications and protocols to proactively set or adjust data transfer parameters (e.g., application controls for UDP transfers, TCP flow controls, etc.) for a session.

Systems and methods described herein predict end-to-end channel capacity entropy to permit use of optimal throughput settings in a network. The systems and methods identify non-linear relationships in KPIs that correlate to end-to-end network conditions (such as congestion), identifies the most-influential KPIs, and predicts network behavior (in relation to the end-to-end network conditions) based on predictions for the most-influential KPIs. Thus, the systems and methods enhance TCP/UDP optimization by permitting proactive throughput based on predictions, instead of reactive responses to network measurements such as RTT.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to FIG. 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    storing, by a computing device, class definitions for a network condition, wherein the class definitions for the network condition include multiple congestion levels ranging from least-congested to most-congested;
    identifying, by the computing device, multiple input features to correlate with the class definitions, wherein the multiple input features include measurable performance indicators for transmission of data over a network;
    generating, by the computing device, a multi class classification model that produces an importance score for each of the multiple input features, wherein each importance score reflects the contribution of one of the multiple input features to the network condition;
    selecting, by the computing device, two or more of the multiple input features with highest importance scores as influential features;
    predicting, by the computing device, the behavior of the influential features to identify a current class, from the class definitions, for the network condition over an end-to-end communication channel; and
    sending, by the computing device, an estimated network condition, based on the current class, to a device for traffic optimization.

2. The method of claim 1, wherein the class definitions for the network condition include congestion levels based on one or more of physical resource block utilization and perceived throughput.

3. The method of claim 1, wherein the congestion levels are based on one or more of application layer round trip times or burst rates.

4. The method of claim 1, wherein selecting two or more of the multiple input features includes assigning one of a raw score, a weighted score, or a percentile score to each of the multiple input features.

5. The method of claim 1, further comprising:
    configuring, by an end device, a transmission throughput for a session based on the estimated network condition.

6. The method of claim 1, wherein at least some of the multiple input features have non-linear relationships with the network condition.

7. The method of claim 1, wherein the input features include key performance indicators for a radio access network (RAN).

8. The method of claim 1, wherein the input features include an initial block error ratio, an average number of radio resource controls (RRCs) in connected mode; a physical resource block utilization value, a layer 1 throughput, and a radio link control (RL retransmission rate.

9. The method of claim 1, wherein the predicting includes generating a prediction model using backpropagation through time to updated weights in a recursive neural network of the influential features.

10. The method of claim 1, wherein generating the multiclass classification model includes using machine learning with boosted decision trees.

11. A computing device comprising:
    a memory configured to store instructions; and
    a processor configured to execute the instructions to:
        store class definitions for a network condition, wherein the class definitions for the network condition include multiple congestion levels ranging from least-congested to most-congested,
        identify multiple input features to correlate with the class definitions, wherein each of the multiple input features include measurable performance indicators for transmission of data over a network,
        generate a multiclass classification model that produces an importance score for each of the multiple input features, wherein each importance score reflects the contribution of one of the multiple input features to the network condition,
        select two or more of the multiple input features with highest importance scores as influential features,
        predict the behavior of the influential features to identify a current class, from the class definitions, for the network condition over an end-to-end communication channel, and
        send an estimated network condition, based on the current class, to a device for traffic optimization.

12. The computing device of claim 11, wherein the class definitions for the network condition include congestion levels based on one or more of physical resource block utilization and perceived throughput.

13. The computing device of claim 11, wherein the congestion levels are based on one or more of application layer round trip times or burst rates.

14. The computing device of claim 11, wherein at least some of the multiple input features have non-linear relationships with the network condition.

15. The computing device of claim 11, wherein the processor is further configured to:
    configure transmission throughput for a session based on the estimated network condition.

16. The computing device of claim 11, wherein the input features include key performance indicators for a radio access network (RAN) and at least one other network.

17. The computing device of claim 11, wherein, when generating the multiclass classification model, the processor is further configured to apply machine leaning with boosted decision trees, and wherein, when predicting the behavior of the influential features, the processor is further configured to generate a prediction model using backpropagation through time to update weights in a recursive neural network of the influential features.

18. A system, comprising:

a computing device configured to:

store Mass definitions for a network condition, wherein the class definitions for the network condition include multiple congestion levels ranging from least-congested to most-congested, identify multiple input features to correlate with the class definitions, wherein each of the multiple input features include measurable performance indicators for transmission of data over a network, generate a multiclass classification model that produces an importance score for each of the multiple input features, wherein each importance score reflects the contribution of one of the multiple input features to the network condition, select two or more of the multiple input features with highest importance scores as influential features, predict the behavior of the influential features to identify a current class, from the class definitions, for the network condition over an end-to-end communication channel, and send an estimated network condition, based on the current class, to a network device for traffic optimization.

19. The system of claim 18, further comprising:

a network optimizing device configured to configure transmission throughput for an end-to-end session based on the estimated network condition.

20. The system of claim 18, wherein at least some of the multiple input features have non-linear relationships with the network condition.

\* \* \* \* \*